US008842319B2

(12) United States Patent
DeRoller

(10) Patent No.: US 8,842,319 B2
(45) Date of Patent: Sep. 23, 2014

(54) CONTEXT AWARE DOCUMENT SERVICES FOR MOBILE DEVICE USERS

(75) Inventor: Matthew DeRoller, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 158 days.

(21) Appl. No.: 13/590,403

(22) Filed: Aug. 21, 2012

(65) Prior Publication Data

US 2014/0055812 A1 Feb. 27, 2014

(51) Int. Cl.
*G06K 15/02* (2006.01)
*G06F 17/00* (2006.01)
(52) U.S. Cl.
USPC .......................... 358/1.15; 358/434; 715/273
(58) Field of Classification Search
CPC ... G06K 15/02; G06K 15/40; G06K 15/4005; G06K 15/4045; G06F 17/00; G06F 19/00; G06F 21/00; G06F 21/30; G06F 21/31; H04N 1/00838; H04N 1/00854; H04N 1/32101
USPC .................... 358/1.1, 1.15, 401, 434; 715/273
See application file for complete search history.

(56) References Cited

U.S. PATENT DOCUMENTS

| 6,421,716 | B1 | 7/2002 | Eldridge et al. | |
|---|---|---|---|---|
| 2004/0004663 | A1* | 1/2004 | Kahn et al. | 348/207.1 |
| 2006/0293837 | A1* | 12/2006 | Bennett | 701/200 |

* cited by examiner

*Primary Examiner* — Thomas D Lee
(74) *Attorney, Agent, or Firm* — Fox Rothschild LLP

(57) ABSTRACT

Systems and methods for providing document services to users thereof. The methods involve: obtaining context information describing at least one aspect of a current situation of a user of a mobile communication device; receiving a request for a document service in response to a user software interaction at the mobile communication device; and adapting the document service based on the context information. The document service comprises a print service, a document conversion service, a document workflow service, a secure access service, or a web service. The obtaining, receiving and adapting steps are collectively performed by at least one of the mobile communication device and a computing device (e.g., a server) remotely located from the mobile communication device.

9 Claims, 8 Drawing Sheets

CONTEXT AWARE DOCUMENT SERVICES FOR MOBILE DEVICE USERS

BACKGROUND

This document relates generally to a system for performing document services using mobile computing devices, and more particularly, to a system for providing users of mobile computing devices with context aware document services.

With the commercialization of Information Technology ("IT") and the transition to a mobile workforce, the use of mobile computing devices is becoming more prevalent among business organizations. The mobile computing devices typically include Personal Digital Assistants ("PDAs"), smartphones, tablet computers, ultra-mobile Personal Computers ("PCs"), and wearable computers. As a result of the increased use of IT by business organizations, mobile workers have become significant consumers of document services (e.g., printing, copying, duplicating, scanning, imaging, document conversion, document workflow, secure access and web services). The mobile workers expect the same document services and capabilities as those provided to them by desktop computers.

SUMMARY

Embodiments described in this document concern systems and methods for providing document services to users thereof. The methods involve: obtaining context information describing at least one aspect of a current situation of a user of a mobile communication device; receiving a request for a document service in response to a user software interaction at the mobile communication device; and adapting the document service based on the context information. The obtaining, receiving and adapting steps are collectively performed by at least one of the mobile communication device and a computing device (e.g., a server) remotely located from the mobile communication device. The document service may include, but is not limited to, a print service, a document conversion service, a document workflow service, a secure access service, or a web service.

The context information includes, but is not limited to, physical context information, logical context information, and mobile device context information. The physical context information specifies a location of the mobile communication device, a network connectivity to the mobile communication device, movement of the mobile communication device, a past location history identifying geographic locations and places visited by the user, a past network connectivity history, and/or a history of mobile device movement. The logical context information specifies an entitlement, a security setting, a preference setting, a user profile, a relationship between the user and another person, an entitlement history, a security setting history, a preference setting history, a user profile history, and/or a user relationship history. The mobile device context information specifies at least one capability of the mobile communication device.

According to aspects of the present invention, the methods further involve: analyzing the context information to determine if the user is in a public environment or a private environment; adapting the document service in a first manner if the user is in a public environment; and adapting the document service in a second manner if the user is in a private environment. In such scenarios, the second manner is the same as or different than the first manner.

According to other aspects of the present invention, the methods further involve: capturing an image of a document using a camera of the mobile communication device; receiving a request to submit the image to a workflow; and submitting the image to the workflow only if it is determined, based on the context information, that the user is authorized to do so at a present time. Information may be logged which describes activities related to the provision of the document service that are performed by at least one of the mobile communication device and the computing device.

According to yet other aspects of the present invention, the methods further involve: receiving a request to print a document or an image of the document at the mobile communication device; identifying, based on the context information, at least one printer located at or near a current location of the user that may handle the document or image; and printing the document or image using the identified printer only if it is determined, based on the context information, that the user is authorized to print the document or image using a printer at or near a current location of the user.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
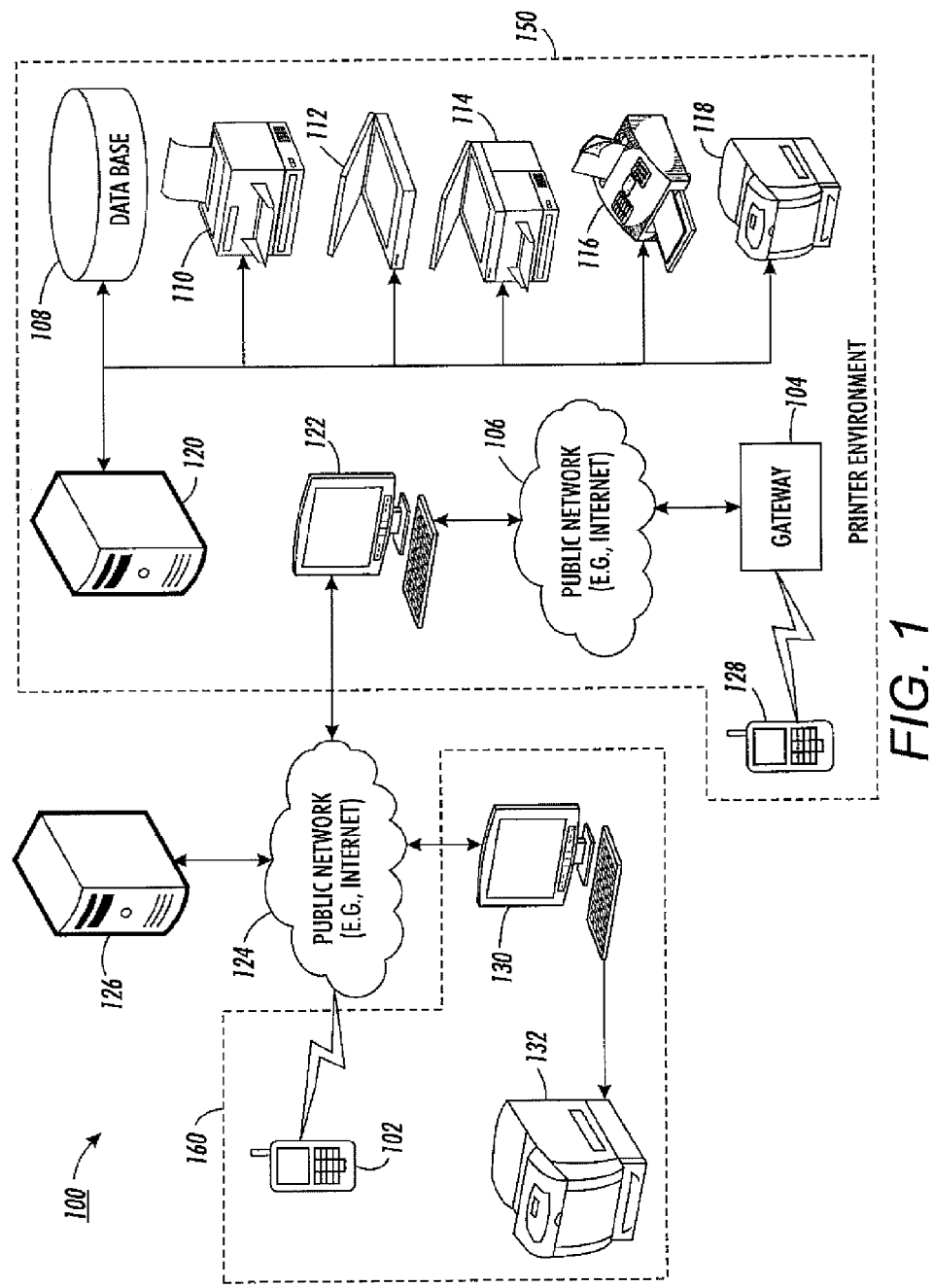
FIG. 1 is a schematic illustration of an exemplary system configured to tailor document services for users based on "context" information relating thereto.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Embodiments will now be described with respect to FIGS. 1-7B. Embodiments generally relate to systems and methods for providing document services that leverage information about the "context" of a user. The term "document service", as used herein, refers to services for managing documents. As such, document services may include, but are not limited to, printing, copying, duplicating, scanning, imaging, document conversion, document workflow, secure access and web services. The "context" can include, but is not limited to, information relating to aspects of a user's situation that can affect functionality of a mobile device and/or document services. This information includes physical context information, logical context information, and mobile device context information. Physical context information specifies a location of a mobile device (e.g., global positioning system information), a network connectivity to the mobile device, movement of the mobile device, a past location history indentifying geographic locations and/or places (e.g., stores) visited by a user, a past network connectivity history, and/or a history of mobile device movement. Logical context information specifies an entitlement (i.e., the document services that a particular user is entitled to use), security settings (e.g., certain types of documents can not be submitted to a workflow via a mobile device located in a public establishment), preference settings, a user profile, relationships between users, an entitlement history, a security setting history, a preference setting history, a user profile history, and/or a user relationship history. Mobile device information specifies the capabilities of the mobile device. By leveraging the above described "context" information, document services can be tailored to maximize productivity and overall user satisfaction with the document services. The term "to tailor", as used herein, means to make, alter, or adapt for a particular end or purpose. For example, a "tailored" document service can comprise a service that was altered or adapted in accordance with a current situation of a mobile device user.

Referring now to FIG. 1, there is provided a schematic illustration of an example of a system 100. The system 100 is generally configured to tailor or adapt document services for users based on "context" information relating thereto. In this regard, the system 100 comprises components located within a private environment 150 and a public environment 160. The private environment 150 can include, but is not limited to, a business facility with restricted access to employees and visitors of employees. A public environment 160 can include, but is not limited to, a public library or a public document service provider facility. Notably, the document services can be tailored or adapted similarly or differently for users of Mobile Communication Devices ("MCD") 102, 128 located in private/public environments 150, 160 based on the "context" information associated therewith. This feature of the present invention will become more evident as the discussion progresses.

The private environment 150 can include, but is not limited to, a gateway 104, a private network 106, a computing device 122, a server 120, a database 108 and a plurality of document handling devices 110-118. The gateway 104 facilitates communications between the MCD 128 and devices 108-122 of the private network 106. MCD 128 can include a mobile phone, a PDA, a smartphone, a tablet computer, or a mobile PC. The private network 106 may comprise an Intranet or any other type of network with restricted access thereto. The document handling devices 110-118 can include a printer 110, a seamier 112, a copier 114, a fax machine 116 and/or a multi-functional device 118. Each of the listed devices 110-118 is well known in the art, and therefore will not be described herein. The computing device 122 is able to communicate using the private network 106 or a public network 124. As such, MCD 102 can also communicate with computing device 122 via public network 124.

The public environment 160 can include, but is not limited to, a computing device 130 and a multi-functional device 132. The computing device 130 is configured to communicate with the MCD 102 via the public network 124. MCD 102 can include a mobile phone, a PDA, a smartphone, a tablet computer, or a mobile PC. The public network 124 can include the Internet or any other network that does not have restricted access. The multi-functional device 132 has a printing capability, a copying capability, a fax capability and a scanning capability.

Notably, the MCDs 102, 128, servers 120, 126 and/or computing device 122 implement novel methods for providing document services that leverage information about the "context" of users. Examples of such methods will be described below in relation to FIGS. 6-7B. These methods generally involve adapting printing services, document workflow services, document automation services, document access services, and document chain of custody services based on "context" information. In this regard, the devices 102, 120, 122, 126, 128 employ document service software implementing all or a portion of such methods. This document service software will be described in detail below.

Figure 2:
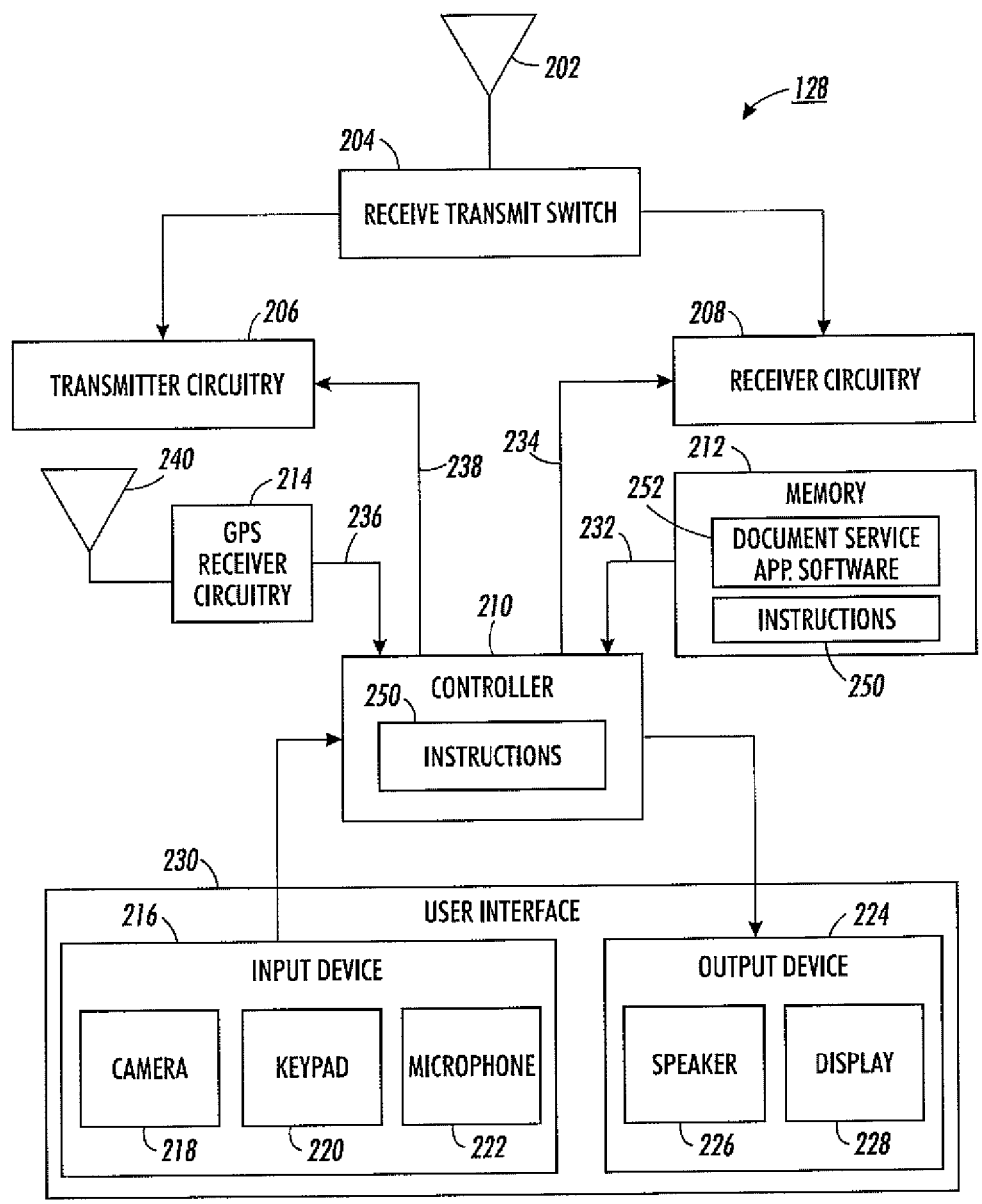
FIG. 2 is a schematic illustration of an exemplary architecture for mobile communication device with document service software installed thereon.

Referring now to FIG. 2, there is provided a schematic illustration of an example of an architecture for MCD 128. MCD 102 is the same as or similar to MCD 128. As such, the discussion provided below in relation to MCD 128 is sufficient for understanding the hardware and software architecture thereof. Notably, MCD 128 may include more or less components than those shown in FIG. 2. However, the components shown are sufficient to disclose an illustrative embodiment implementing the present invention. Some or all of the components of the MCD 128 can be implemented as hardware, software and/or a combination of hardware and software. The hardware includes, but is not limited to, one or more electronic circuits.

The hardware architecture of FIG. 2 represents one embodiment of a representative MCD 128 configured to facilitate the adapting of document services for users based on "context" information relating thereto. In this regard, MCD 128 comprises an antenna 202 for receiving and transmitting Radio Frequency ("RF") signals. A receive/transmit ("Rx/Tx") switch 204 selectively couples the antenna 202 to the transmitter circuitry 206 and receiver circuitry 208 in a manner familiar to those skilled in the art. The receiver circuitry 208 demodulates and decodes the RF signals received from a network (e.g., the network 124 of FIG. 1) or a gateway (e.g., gateway 104 of FIG. 1) to derive information therefrom. The receiver circuitry 208 is coupled to a controller (or microprocessor) 210 via an electrical connection 234. The receiver circuitry 208 provides the decoded signal information to the controller 210. The controller 210 uses the decoded RF signal information in accordance with the function(s) of the MCD 128.

The controller 210 also provides information to the transmitter circuitry 206 for encoding and modulating information into RF signals. Accordingly, the controller 210 is coupled to the transmitter circuitry 206 via an electrical connection 238. The transmitter circuitry 206 communicates the RF signals to the antenna 202 for transmission to an external device (e.g., a gateway 104 or a node of a public network 124 of FIG. 1) via the Rx/Tx switch 204.

An antenna 240 is coupled to Global Positioning System ("GPS") receiver circuitry 214 for receiving GPS signals. The GPS receiver circuitry 214 demodulates and decodes the GPS signals to extract GPS location information therefrom. The GPS location information indicates the location of the MCD 128. The GPS receiver circuitry 214 provides the decoded GPS location information to the controller 210. As such, the GPS receiver circuitry 214 is coupled to the controller 210 via an electrical connection 236. The controller 210 uses the decoded GPS location information in accordance with the function(s) of the MCD 128. For example, the GPS location information can be used by the MCD 128 to tailor or adapt document services for a user thereof.

The controller 210 stores the decoded RF signal information and the decoded GPS location information in a memory 212 of the MCD 128. Accordingly, the memory 212 is connected to and accessible by the controller 210 through an electrical connection 232. The memory 212 may be a volatile memory and/or a non-volatile memory. For example, the memory 212 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 212 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure. The memory 212 can also be used to store various other types of information therein, such as authentication information, cryptographic information, physical context information, logical context information, mobile device context information and various document-related information.

As shown in FIG. 2, one or more sets of instructions 250 are stored in the memory 212. The instructions 250 include customizable instructions and non-customizable instructions. The instructions 250 can also reside, completely or at least partially, within the controller 210 during execution thereof by MCD 128. In this regard, the memory 212 and the controller 210 can constitute machine-readable media. The term "machine-readable media", as used here, refers to a single medium or multiple media that stores one or more sets of instructions 250. The term "machine-readable media", as used here, also refers to any medium that is capable of storing, encoding or carrying the set of instructions 250 for execution by the MCD 128 and that causes the MCD 128 to perform one or more of the methodologies of the present disclosure.

The controller 210 is also connected to a user interface 230. The user interface 230 is comprised of input devices 216, output devices 224 and software routines (not shown in FIG. 2) configured to allow a user to interact with and control software applications (e.g., document service application software 252 and other software applications) installed on the MCD 128. Such input and output devices may include, but are not limited to, a display 228, a speaker 226, a keypad 220, a directional pad (not shown in FIG. 2), a directional knob (not shown in FIG. 2), a microphone 222 and a camera 218. The display 228 may be designed to accept touch screen inputs. As such, user interface 230 can facilitate a user-software interaction for launching applications (e.g., document service application software 252) installed on the MCD 128. The user interface 230 can facilitate a user-software interactive session for writing and reading document-related data stored in memory 212. This document-related data can include, but is not limited to, image data defining image's of documents obtained using camera 218, data describing a workflow request, data describing print/copy/fax/scan, request, and data describing print/copy/fax/scan jobs.

Figure 3:
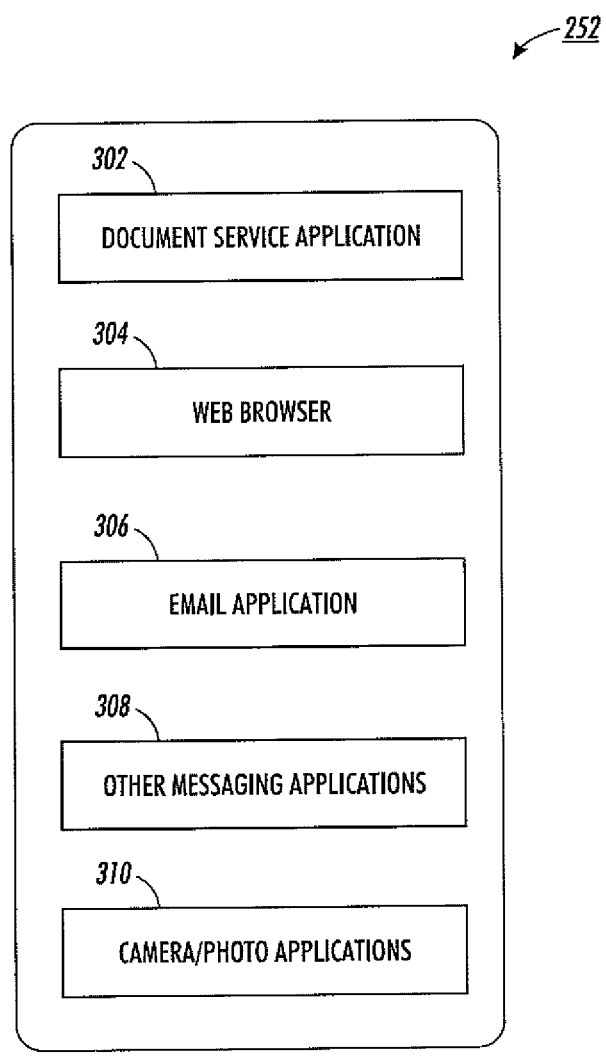
FIG. 3 is a schematic illustration that is useful for understanding document service application software.

The display 228, keypad 220, directional pad (not shown in FIG. 2) and directional knob (not shown in FIG. 2) can collectively provide a user with a means to initiate one or more software applications or functions of the MCD 128. The document service application software 252 can facilitate the provision of document services that are specifically tailored or adapted to the "context" of a user of the MCD 128. In this regard, as shown in FIG. 3, the document service application software 252 comprises any or all of the following: a document service application 302; a web browser application 304; an email application 306; other messaging applications 308; and a camera/photo application 310. The document service application 302 is generally operative to communicate with computing device (e.g., devices 120, 122 and/or 126 of FIG. 1) using a service Application Programming Interface ("API"). The web browser 304 is generally operative to facilitate user access to document service websites and document repositories (e.g., database 108 of FIG. 1). The email and messaging applications 306, 308 are generally operative to allow users to receive various notifications regarding document services. The camera/photo application is generally operative to facilitate capturing of images of documents to be submitted to a workflow or to a document handling device (e.g., a printer).

During operation, the document service application software 252 obtains information about the "context" of the user of the MCD 128. This information can include, but is not limited to, physical context information, logical context information, and mobile device context information. Physical context information specifies a location of MCD 128 (e.g., GPS information), a network connectivity to MCD 128, movement of MCD 128, a past location history indentifying cities and/or stores visited by the user of MCD 128, a past network connectivity history, and/or a history of MCD movement. Logical context information specifies an entitlement (i.e., the document services that the user is entitled to use), security settings (e.g., certain types of documents can not be submitted to a workflow via MCD 128 when it is located in a public environment), preference settings, a user profile, relationships between the user of MCD 128 and users of other network equipment (e.g., devices 102, 122 and/or 130 of FIG. 1), an entitlement history, a security setting history, a preference setting history, a user profile history, and/or a user relationship history. Mobile device information specifies the capabilities of the mobile device.

The document service application software 252 also performs one or more of the following: store the "context" information in memory 212; access captured images of documents stored in memory 212; process such images to improve the quality thereof; generate messages including at least a portion of the "context" information; generate messages including requests to submit an image to a workflow; communicate messages to and from external devices; process the "context" information to determine if a user is authorized to submit an image of a document to a workflow at the present time; present an indication to the user of the MCD 128 that s/he is or is not authorized to submit a document image to a workflow at the present time; submit a document image to a workflow; and add information about a workflow request to a log file.

The document service application software 252 further performs one or more of the following: receive requests from the user of the MCD 128 to print an image of a document that was previously captured by camera 218 and/or a document which is stored in a remotely located database (e.g., database 108 of FIG. 1); generate messages including requests to print images/documents; process "context" information to determine if the user is authorized to print an image/document using a printer at or near her/his current location; present an indication to the user of the MCD 128 that s/he is or is not authorized to print an image/document using a printer at or near her/his current location; identify one or more printers that are at or near the user's current location by which the image/document can be printed, based on "context" information; present information identifying a first printer or an ordered list of second printers at or near her/his current location by which the image/document may be printed; receive a user request to print the image/document from the first printer or a user selected one of the second printers; determine an optimization communication path based on "context" information; send a print request message to a printer; and add information about a print request and/or a print job to a log file.

Figure 4:
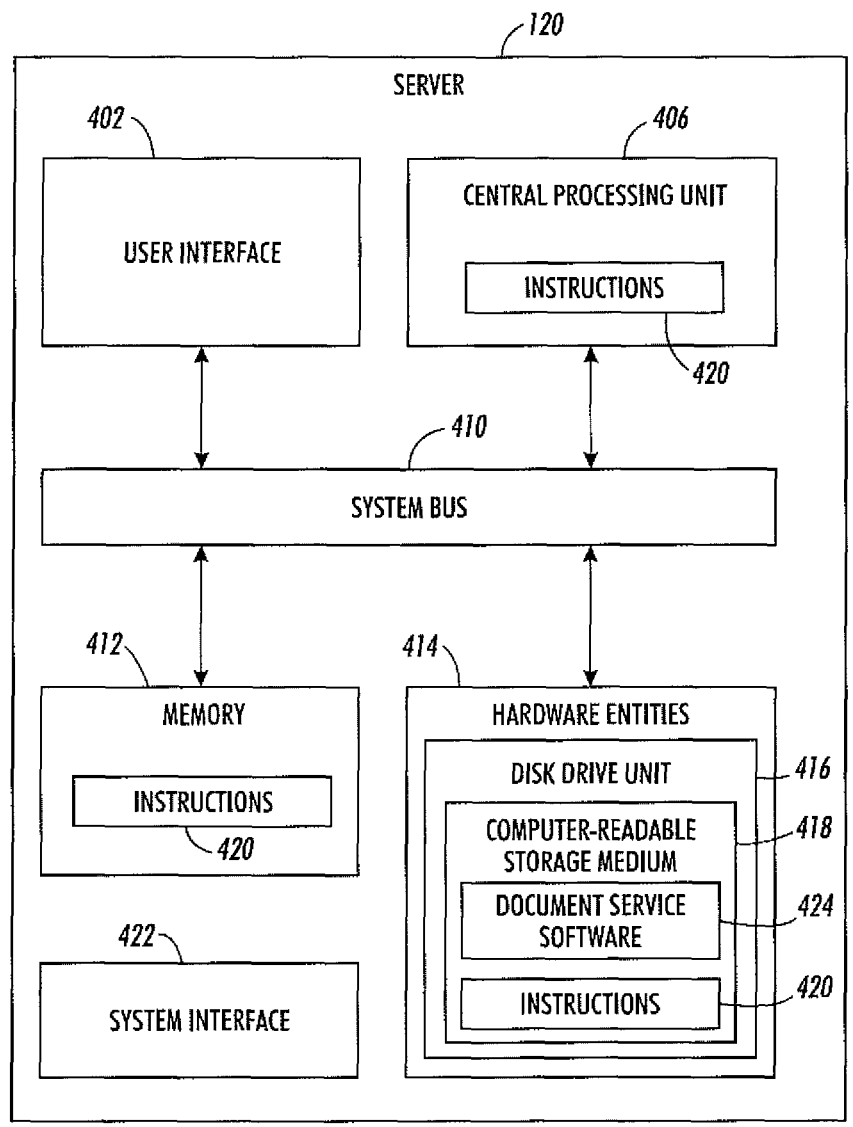
FIG. 4 is a block diagram of an exemplary server architecture.

Referring now to FIG. 4, there is provided a block diagram of an embodiment of the server 120. The server 126 of FIG. 1 can be the same as or similar to server 120. As such, the following discussion of server 120 is sufficient for understanding server 126 of FIG. 1. Notably, some or all of the components of the server 120 can be implemented as hardware, software and/or a combination of hardware and software. The hardware includes, but is not limited to, one or more electronic circuits.

The server 120 may include more or less components than those shown in FIG. 4. However, the components shown are sufficient to disclose an illustrative embodiment implementing the present invention. The hardware architecture of FIG. 4 represents one embodiment of a representative computing device configured to facilitate the adapting of document services for users based on "context" information relating thereto. As such, the server 120 of FIG. 2 implements at least a portion of improved methods for providing document services that leverage information about the "context" of a user in accordance with various embodiments.

As shown in FIG. 4, the server 120 includes a system interface 422, a user interface 402, a Central Processing Unit ("CPU") 406, a system bus 410, a memory 412 connected to and accessible by other portions of server 120 through system bus 410, and hardware entities 414 connected to system bus 410. At least some of the hardware entities 414 perform actions involving access to and use of memory 412, which can be a RAM, a disk driver and/or a Compact Disc ROM ("CD-ROM").

System interface 422 allows the server 120 to communicate directly or indirectly with external communication devices (e.g., MCD 128 and/or computing device 122 of FIG. 1). If the server 120 is communicating indirectly with the external communication device, then the server 120 is sending and receiving communications through a common network (e.g., the network 106 shown in FIG. 1).

Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the server 120. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the server 120 and that cause the server 120 to perform any one or more of the methodologies of the present disclosure.

Figure 5:
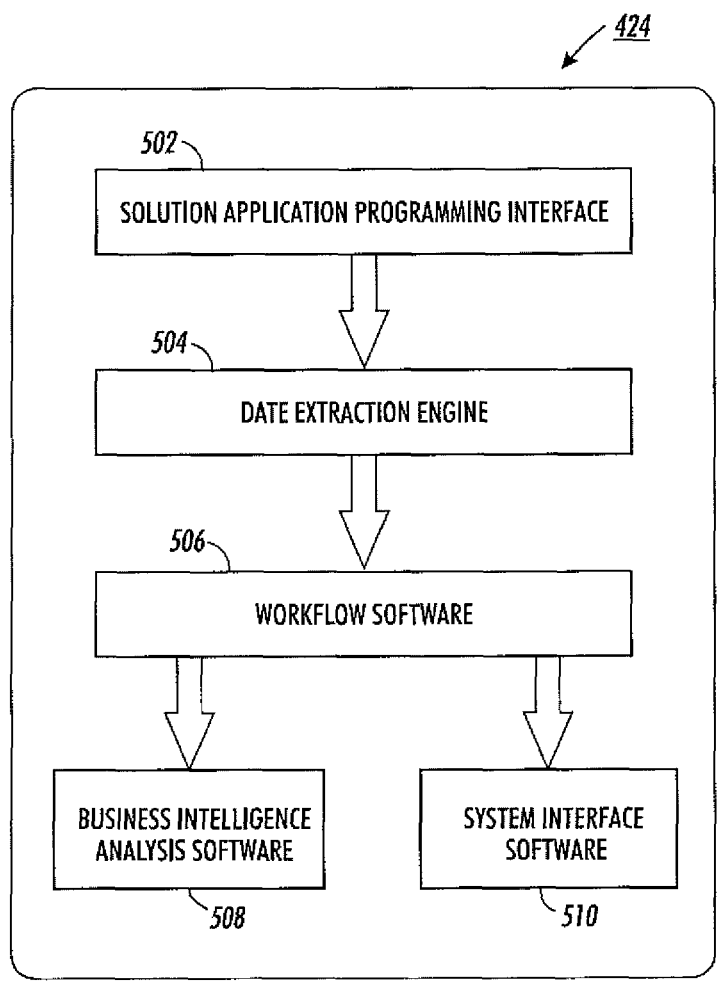
FIG. 5 is schematic illustration that is useful for understanding document service software.

In some embodiments of the present invention, the hardware entities 414 include an electronic circuit (e.g., a processor) programmed for facilitating a provision of document services that leverage information about the "context" of users. In this regard, it should be understood that the electronic circuit can access and run document service software 424 and other types of software installed on the server 120. As shown in FIG. 5, the document service software 424 comprises a Solution Application Programming Interface ("SAPI") 502, a data extraction engine 504, workflow software 506, Business Intelligence Analysis ("BIA") software 508 and System Interface ("SI") software 510. The SAPI 502 facilitates the provision of an interface between server 120 and document handling devices (e.g., devices 108-118 and/or 132 of FIG. 1). The data extraction engine 504 is operative to automate character recognition and form validation. The workflow software 506 is operative to process business rules, audit reporting, control reporting and manage workflow operations. The BIA software 508 is designed to retrieve, analyze and report data. The SI software 510 facilitates the provision of interfaces between the server 120 and other public/private devices owned by other business organizations.

During operation, the document service software 424 performs operations to facilitate: decisions as to whether users are authorized to submit images of documents to workflows at specific times; the display of information to users indicating that they are or are not authorized to submit images of documents to workflows; the submissions of document images to workflows; and/or the recording of some or all of the document service related activities performed by the server.

The document service software 424 also performs operations to facilitate any or all of the following: decisions as to whether users are authorized to print images/documents using printers at or near their current locations; the display of information to users indicating that they are or are not authorized to print images/documents using printers at or near their current locations; an identification of one or more printers at or near the users current locations that they may use to print images/documents; the display of information identifying a single printer or a plurality of printers at or near the users current locations by which the images/documents can be printed; the generation of an ordered list of printers at or near the users current locations by which the images/documents can be printed; the determination of communication paths, which are preferred in given situations, along which print request messages including the images/documents are to travel; the improvement of image quality; and/or the printing of images/documents from a specified printer or a user selected printer.

Figure 6:
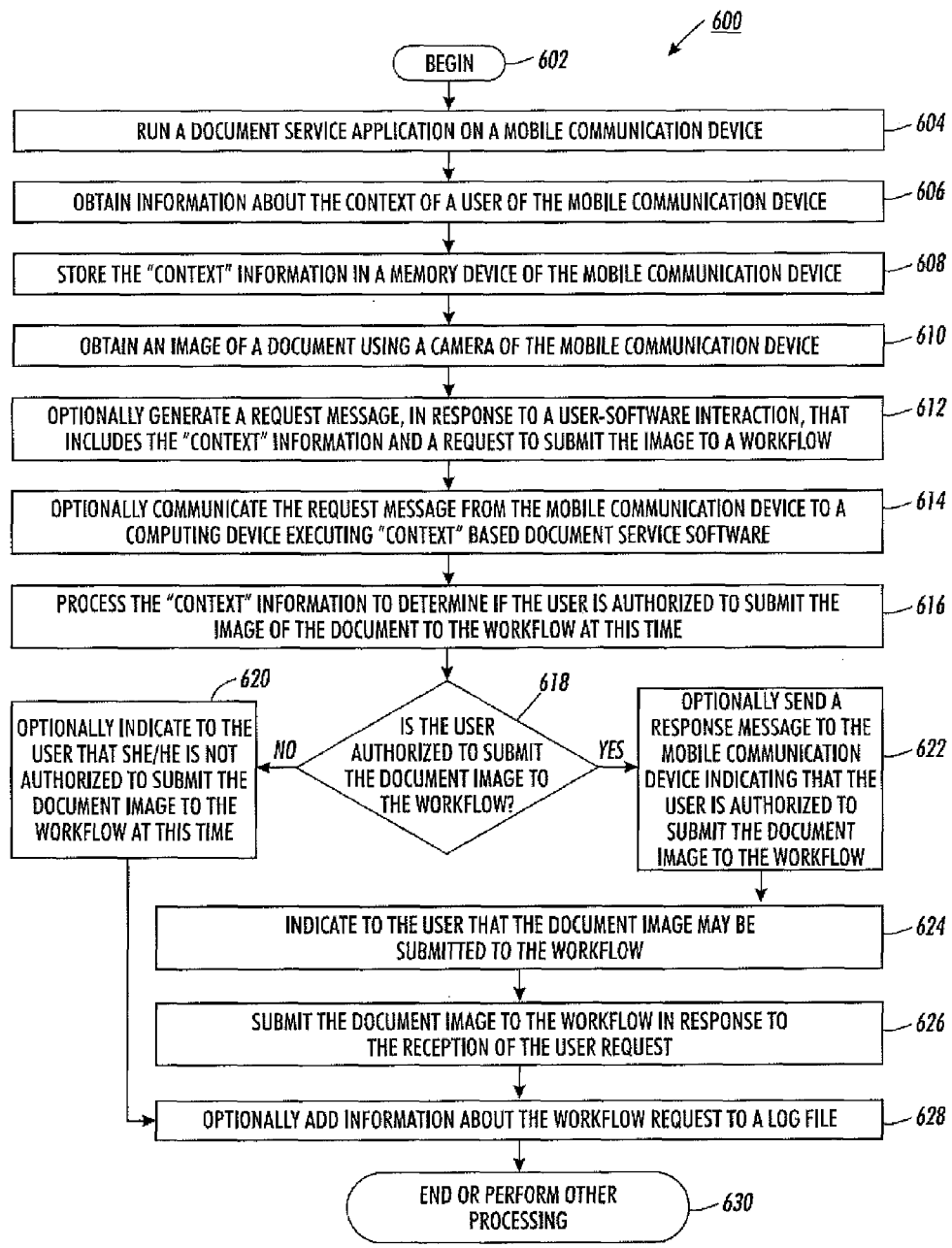
FIG. 6 is a flow diagram of an exemplary method for submitting an image of a document to a workflow.

Referring now to FIG. 6, there is provided a flow diagram of a method 600 for submitting an image of a document to a workflow. The method 600 begins with step 602 and continues to step 604. In step 604, a document service application (e.g., document service application software 252 of FIG. 2) is run on an MCD (e.g., MCD 102 or 128 of FIG. 1). Next, "context" information is obtained by the MCD, as shown by step 606. The "context" information includes, but is not limited to, physical context information, logical context information and mobile device context information. The "context" information is then stored in a memory device (e.g., memory device 212 of FIG. 2) of the MCD, as shown by step 608.

At some point during use of the MCD, the user thereof may desire to submit an image of a document to a workflow. Accordingly, the user may perform user-software interactions in step 610 for capturing an image of a document using a camera (e.g., camera 218 of FIG. 2) of the MCD. This image is also referred to herein as a "document image". Once an image has been captured, an optional step 612 is performed where a request message is generated by the MCD in response to a user-software interaction. The request message includes all or a portion of the "context" information obtained in previous step 606. The request message may also include a request to submit the image captured in previous step 610 to a workflow.

The request message may be communicated from the MCD to a computing device (e.g., computing device 122, server 120 or server 126 of FIG. 1) that is remotely located from the MCD, as shown by step 614. The computing device can be selected in step 614 from a plurality of computing devices based on the location of the user of the MCD. For example, server 126 of FIG. 1 is selected if the user is out of the office. Alternatively, server 120 is selected if the user is in the office.

In a next step 616, the "context" information is processed by the MCD or the computing device selected in previous step 614. The "context" information is processed to determine if the user is authorized to submit the document image to the workflow at this time. The determination is made based on: whether an administrator (e.g., an expense report administrator) is currently available/unavailable to provide authorization for such a submission (e.g., a submission of an expense report); whether the capabilities of the camera of the MCD are satisfactory for the type of document for which an image is to be submitted (i.e., images of documents of particular types are required to have a particular resolution); whether the user is in a private or public environment; and/or the level of security assigned to the type of document for which an image is to be submitted. The level of security can include, but is not limited to, non-confidential, confidential, secret, and top secret. For example, an image of a document including confidential and/or secret information can only be submitted to a workflow by an MCD via a private network (e.g., network 106 of FIG. 1), and not a public network (e.g., network 124 of FIG. 1). In contrast, an image of a document including non-confidential information may be submitted to a workflow via a private network and a public network.

If it is determined that the user is not authorized to submit the document image to the workflow [618:NO], then an optional step 620 may be performed. In optional step 620, the MCD may perform actions for indicating to the user thereof that s/he is not authorized to submit the document image to the workflow at this time. The indication can include, but is not limited to, an emission of light from a Light Emitting Diode ("LED"), an output of noise from a speaker (e.g., speaker 226 of FIG. 2) of the MCD and/or a display of a graphical element (e.g., an icon) on a display (e.g., display 228 of FIG. 2) of the MCD. Upon completing optional step 620, information about the workflow is added to a log file by the MCD and/or the computing device selected in previous step 613, as shown by optional step 628. The logging of such information facilitates the provision of a "chain of custody" document service. Subsequently, step 630 is performed where the method 600 ends or other processing is performed.

If it is determined that the user is authorized to submit the document image to the workflow [618:YES], then an optional step 622 may be performed. In optional step 622, a response message may be sent from the remotely located computing device to the MCD indicating that the user is authorized to submit the document image to the workflow at this time. Thereafter in step 624, the MCD may perform actions for indicating to the user thereof that s/he is authorized to submit the document image to the workflow at this time. The indication can include, but is not limited to, an emission of light from an LED, an output of noise from a speaker (e.g., speaker 226 of FIG. 2) of the MCD and/or a display of a graphical element (e.g., an icon) on a display (e.g., display 228 of FIG. 2) of the MCD. The MCD also performs actions in step 626 to submit the document image to the workflow in response to the reception of a user request. Upon completing step 626, information about the workflow is added to a log file by the MCD and/or the computing device selected in previous step 613, as shown by optional step 628. Subsequently, step 630 is performed where the method 600 ends or other processing is performed.

Figure 7A:
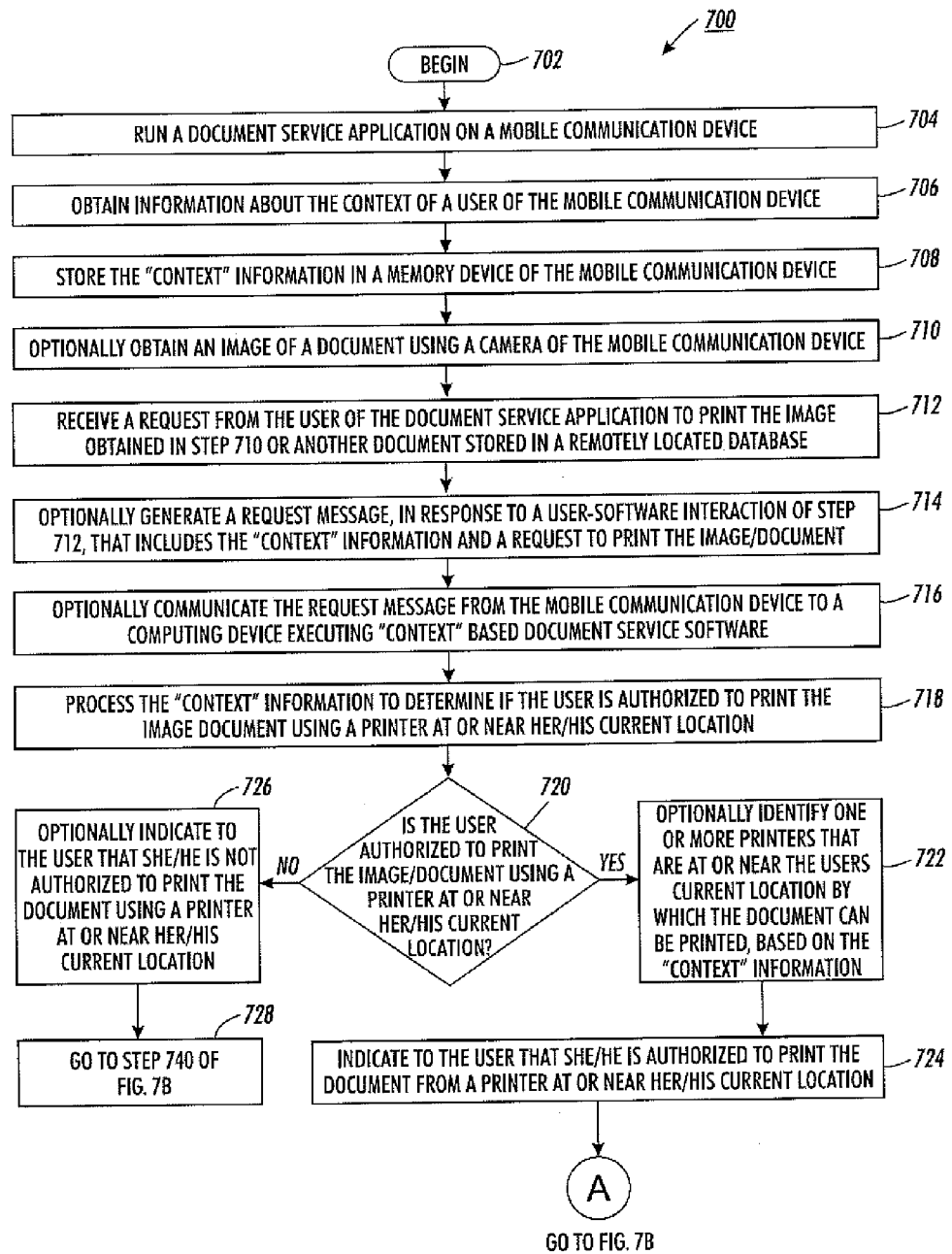
FIGS. 7A-7B provide a flow diagram of an exemplary method for printing a document image and/or a document by a printer at or near a current location of a user.
Figure 7B:
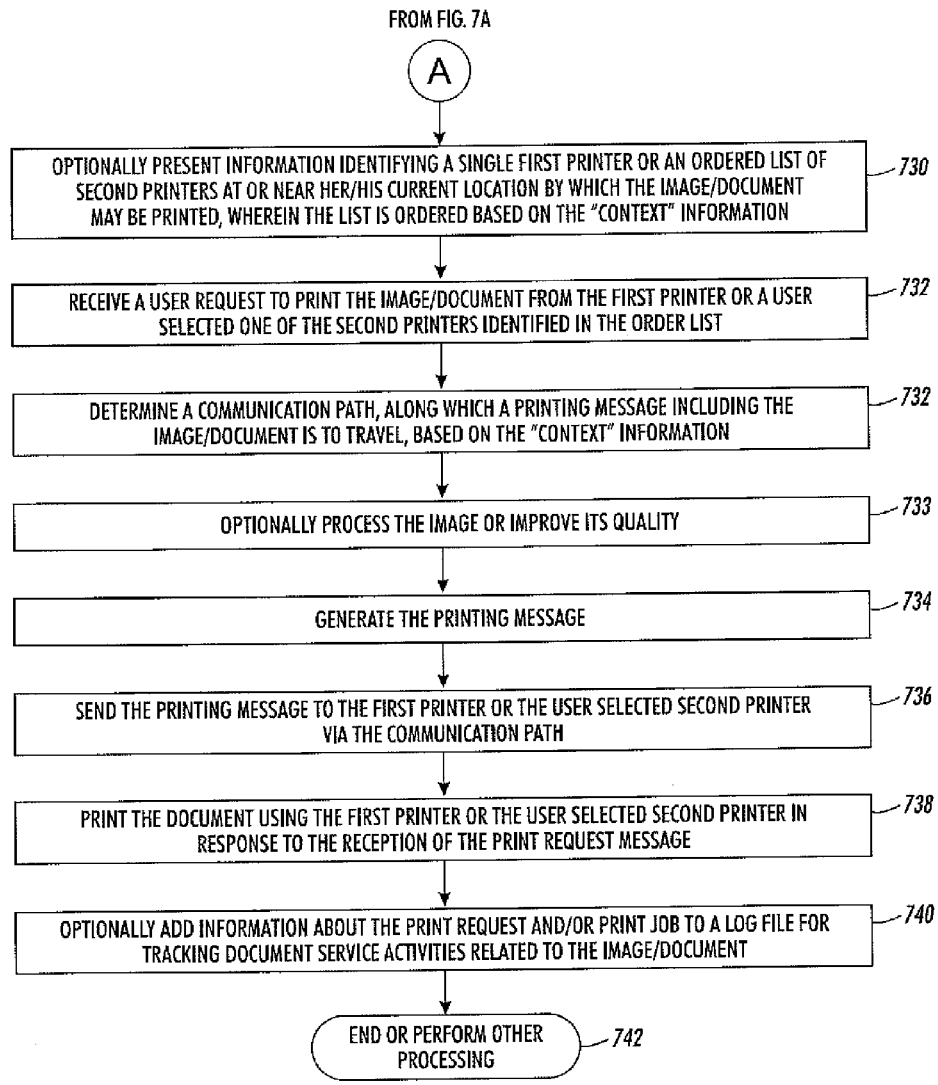

Referring now to FIGS. 7A-7B, there is provided a flow diagram of an exemplary method 700 for printing a document image or a document by a printer at or near a current location of a user of an MCD. The method begins at step 702 and continues with step 704. In step 704, a document service application (e.g., document service application software 252 of FIG. 2) is run on an MCD (e.g., MCD 102 or 128 of FIG. 1). Next, "context" information is obtained by the MCD, as shown by step 706. The "context" information includes, but is not limited to, physical context information, logical context information and mobile device context information. The "context" information is then stored in a memory device (e.g., memory device 212 of FIG. 2) of the MCD, as shown by step 708.

At some point during use of the MCD, the user thereof may desire to print an image of a document. Accordingly, the user may perform user-software interactions in step 710 for capturing an image of a document using a camera (e.g., camera 218 of FIG. 2) of the MCD. This image is also referred to herein as a "document image". Once the document image has been captured, step 712 is performed where a request is received from the user of the document service application to print the document image or a document stored in a remotely located database (e.g., database 108 of FIG. 1). In response to the reception of this request, the MCD may generate a request message in optional step 714. The request message includes all or a portion of the "context" information obtained in previous step 706. The request message can also include a request to print the document image or the document stored in the remotely located database.

The request message may be communicated from the MCD to a computing device (e.g., computing device 122, server 120 or server 126 of FIG. 1) that is remotely located from the MCD, as shown by optional step 716. The computing device can be selected in step 716 from a plurality of computing devices based on the location of the user of the MCD. For example, server 126 of FIG. 1 is selected if the user is out of the office. Alternatively, server 120 is selected if the user is in the office. In all scenarios, the computing device is executing "context" based document service software (e.g., document service software 424 of FIG. 4).

In a next step 718, the "context" information is processed by the MCD or remotely located computing device. The "context" information is processed to determine if the user is authorized to print the document image or the remotely stored document using a printer at or near her/his current location. The determination is based on: whether the user of the MCD has the requisite privilege to access the document; whether the user is in a public environment or a private environment; and/or whether the type of document is allowed to be printed using a public printer.

If it is determined that the user is not authorized to print the document image or remotely stored document using a printer at or near her/his current location [720:NO], then optional step 726 or step 728 is performed. Optional step 726 involves performing actions by the MCD to indicate to the user thereof that s/he is not authorized to print the document image or remotely stored document using a printer at or near her/his current location. The indication can include, but is not limited to, an emission of light from an LED, an output of noise from a speaker (e.g., speaker 226 of FIG. 2) of the MCD and/or a display of a graphical element (e.g., an icon) on a display (e.g., display 228 of FIG. 2) of the MCD. Thereafter, information about the print request may be added to a log file by the MCD or the remotely located computing device, as shown by steps 728 and 740. The information is logged for tracking document service activities related to the document image or remotely stored document. Subsequently, step 742 is performed where the method 700 ends or other processing is performed.

If it is determined that the user is authorized to print the document image or remotely stored document using a printer at or near her/his current location [720:YES], then optional step 722 is performed. In optional step 722, the MCD or remote located computing device performs operations to identify one or more printers that are at or near the user's current location by which the document image or remotely stored document can be printed. The printer(s) is(are) identified based on all or a portion of the "context" information obtained in previous step 706. For example, the printer(s) is(are) selected based on: whether a printer was previously used by the user of the MCD; whether the printer is identified as a favorite printer of the user; whether the user has an account with the public provider of document services to which the printer belongs; whether the document image or remotely stored document is allowed to be printed using a private printer and/or a public printer; the distance of the printer to the user; and/or the printing capabilities of the printer (such as whether the printer can print in color).

In a next step 724, the MCD performs operations to indicate to the user thereof that s/he is authorized to print the document from a printer at or near her/his current location. Also, information identifying a first printer or a plurality of second printers can be presented to the user of the MCD in optional step 730. The first and second printers include printers that are located at or near the current location of the user of the MCD by which the document image or remotely stored document may be printed. The plurality of second printers can be presented in an ordered list format. The printers can be ordered based on all or a portion of the "context" information.

Once the user is notified that s/he is authorized to print, the user performs user software interactions to generate a print request, as shown by step 732. The print request includes a request to print the document image or the remotely located document from the first printer or a user selected one of the plurality of second printers. In response to the user's print request, the MCD or remotely located computing device determines a communication path along which a printing message is to travel, which is preferred in a given situation. The printing message includes the document image or the remotely located document. The communication path is determined based on all or a portion of the "context" information. For example, the communication path can be selected based on: the size of the document image or the remotely stored document; the location of the user; the type of environment the user is currently in; and/or any time delays experienced in the system (e.g., system 100 of FIG. 1). Also, in optional step 733, the document image may be processed to improve the quality thereof. The processing of step 733 can be performed by the MCD or the remotely located computing device.

After the communication path has been selected, the printing message is generated in step 734. The printing message is then sent in step 736 to the first printer or the user-selected second printer via the communication path. In response to the reception of the printing message, the document is printed in step 738 by the first printer or the user selected second printer. Information about the print job may be added to a log file in optional step 740. The print job information can be logged for providing a document service tracking feature. Subsequently, step 742 is performed where the method 700 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

I claim:

1. A method for providing document services to users thereof, comprising:
   obtaining, by a mobile communication device, context information describing at least one aspect of a current situation of a user thereof;
   receiving a user request for a document service at the mobile communication device;
   analyzing, by the mobile communication device, the context information to determine if the user is in a public environment or a private environment; and
   performing operations by the mobile communication device to adapt the document service based on the context information, wherein the adapting comprises:
      adapting the document service in a first manner if the user is in a public environment; and
      adapting the document service in a second manner if the user is in a private environment, the second manner being different than the first manner.

2. A method for providing document services to users thereof, comprising:
   obtaining, by a mobile communication device, context information describing at least one aspect of a current situation of a user thereof;
   receiving a user request for a document service at the mobile communication device;
   performing operations by the mobile communication device to adapt the document service based on the context information;
   capturing an image of a document by the mobile communication device;
   receiving at the mobile communication device a request to submit the image to a workflow; and
   performing operations by the mobile communication device to submit the image to the workflow only if it is determined, based on the context information, that the user is authorized to do so at a present time.

3. A method for providing document services to users thereof, comprising:
   obtaining, by a mobile communication device, context information describing at least one aspect of a current situation of a user thereof;
   receiving a user request for a document service at the mobile communication device;
   performing operations by the mobile communication device to adapt the document service based on the context information
   receiving a request to print a document or an image of the document at the mobile communication device; and
   commanding a document handling device to print the document or the image only if it is determined, based on the context information, that the user is authorized to print the document or image using a printer at or near a current location of the user.

4. A device comprising a computer-readable storage medium, having stored thereon a computer program for providing document services to users thereof, the computer program having a plurality of code sections, the code sections executable by a mobile communication device to cause the mobile communication device to perform the steps of:
   obtaining context information describing at least one aspect of a current situation of a user of the mobile communication device;
   receiving a user request for a document service;
   analyzing the context information to determine if the user is in a public environment or a private environment; and
   adapting the document service based on the context information, wherein the adapting comprises:
      adapting the document service in a first manner if the user is in a public environment; and
      adapting the document service in a second manner if the user is in a private environment, the second manner being different than the first manner.

5. A device comprising a computer-readable storage medium, having stored thereon a computer program for providing document services to users thereof, the computer program having a plurality of code sections, the code sections executable by a mobile communication device to cause the mobile communication device to perform the steps of:
   obtaining context information describing at least one aspect of a current situation of a user of the mobile communication device;
   receiving a user request for a document service; and
   adapting the document service based on the context information;
   wherein the mobile communication device is further caused to:
      capture an image of a document;
      receive a request to submit the image to a workflow; and
      submit the image to the workflow only if it is determined, based on the context information, that the user is authorized to do so at a present time.

6. A device comprising a computer-readable storage medium, having stored thereon a computer program for providing document services to users thereof, the computer program having a plurality of code sections, the code sections executable by a mobile communication device to cause the mobile communication device to perform the steps of:
   obtaining context information describing at least one aspect of a current situation of a user of the mobile communication device;
   receiving a user request for a document service; and
   adapting the document service based on the context information;
   wherein the mobile communication device is further caused to:
      receive a request to print a document or an image of the document; and
      command a document handling device to print the document or the image only if it is determined, based on the context information, that the user is authorized to print the document or image using a printer at or near a current location of the user.

7. A method for providing document services to users thereof, comprising:
   obtaining, by a server, context information describing at least one aspect of a current situation of a user of a mobile communication device;
   receiving, by the server, a user request for a document service;
   analyzing, by the server, the context information to determine if the user is in a public environment or a private environment; and
   adapting the document service based on the context information, wherein the adapting comprises:
      adapting the document service in a first manner when the user is in a public environment; and
      adapting the document service in a second manner when the user is in a private environment, the second manner being different than the first manner.

8. A method for providing document services to users thereof, comprising:
- obtaining, by a server, context information describing at least one aspect of a current situation of a user of a mobile communication device;
- receiving, by the server, a user request for a document service;
- adapting the document service based on the context information;
- receiving, by the server, a request to submit an image of a document captured by a camera of the mobile communication device to a workflow; and
- submitting, by the server, the image to the workflow only if it is determined, based on the context information, that the user is authorized to do so at a present time.

9. A method for providing document services to users thereof, comprising:
- obtaining, by a server, context information describing at least one aspect of a current situation of a user of a mobile communication device;
- receiving, by the server, a user request for a document service;
- adapting the document service based on the context information;
- receiving, by the server, a request to print a document or an image of the document; and
- generating, by the server, a command to print the document or the image only if it is determined, based on the context information, that the user is authorized to print the document or image using a printer at or near a current location of the user.

* * * * *